United States Patent
Jeong

(10) Patent No.: US 9,781,293 B2
(45) Date of Patent: Oct. 3, 2017

(54) APPARATUS AND METHOD FOR MANAGING IMAGE FILES BY DISPLAYING BACKUP INFORMATION

(71) Applicant: SAMSUNG ELECTRONICS CO., LTD., Suwon-si (KR)

(72) Inventor: Jin-gu Jeong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 14/549,011

(22) Filed: Nov. 20, 2014

(65) Prior Publication Data

US 2015/0138394 A1    May 21, 2015

(30) Foreign Application Priority Data

Nov. 20, 2013  (KR) .................. 10-2013-0141473

(51) Int. Cl.
  *H04N 1/21* (2006.01)
  *G06F 17/30* (2006.01)
  *G11B 27/00* (2006.01)
  *H04N 1/32* (2006.01)
  *H04N 5/232* (2006.01)
  *H04N 5/77* (2006.01)
  *H04N 101/00* (2006.01)

(52) U.S. Cl.
  CPC .......... *H04N 1/2125* (2013.01); *G06F 17/30* (2013.01); *G06F 17/30268* (2013.01); *G06F 17/30274* (2013.01); *G11B 27/00* (2013.01); *H04N 1/32128* (2013.01); *H04N 5/23293* (2013.01); *H04N 5/77* (2013.01); *H04N 5/772* (2013.01); *H04N 2101/00* (2013.01)

(58) Field of Classification Search
  CPC ............. H04N 1/2125; H04N 5/23293; H04N 1/32128; H04N 5/77; H04N 2101/00; H04N 5/772; G06F 17/30; G11B 27/00
  See application file for complete search history.

(56) References Cited

U.S. PATENT DOCUMENTS

| | | | |
|---|---|---|---|
| 7,034,880 B1 * | 4/2006 | Endsley | H04N 1/00132 348/207.1 |
| 2002/0051629 A1 * | 5/2002 | Endo | H04N 1/00241 386/289 |
| 2005/0267922 A1 * | 12/2005 | Nakajima | G06F 17/30244 |
| 2005/0283356 A1 * | 12/2005 | Wang | H04L 67/06 704/2 |
| 2009/0119350 A1 * | 5/2009 | Yamaguchi | G11B 27/105 |
| 2010/0002098 A1 * | 1/2010 | Hagiwara | G11B 27/034 348/231.99 |
| 2013/0204865 A1 | 8/2013 | DeLuca et al. | |

* cited by examiner

*Primary Examiner* — Timothy J Henn
(74) *Attorney, Agent, or Firm* — Sughrue Mion, PLLC

(57) ABSTRACT

A method and an apparatus for managing image files by displaying backup information are provided. The method includes: displaying at least one image file; reading a file tag of the at least one image file to determine whether there is backup information; and when there is the backup information as a result of the determination, displaying a predetermined object associated with the backup information.

18 Claims, 7 Drawing Sheets

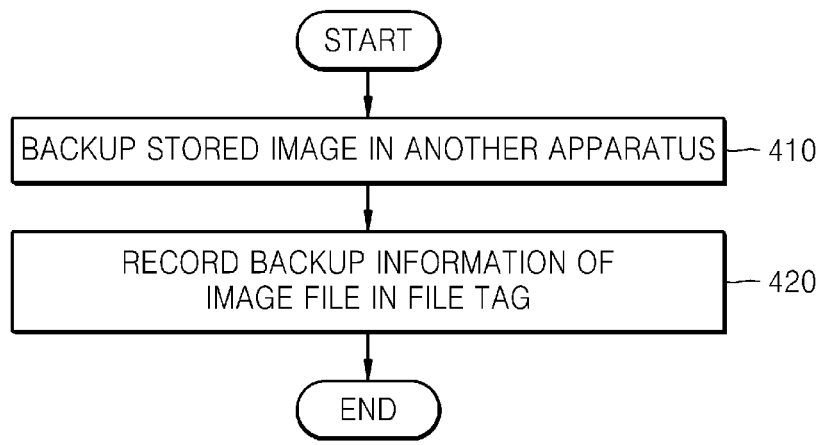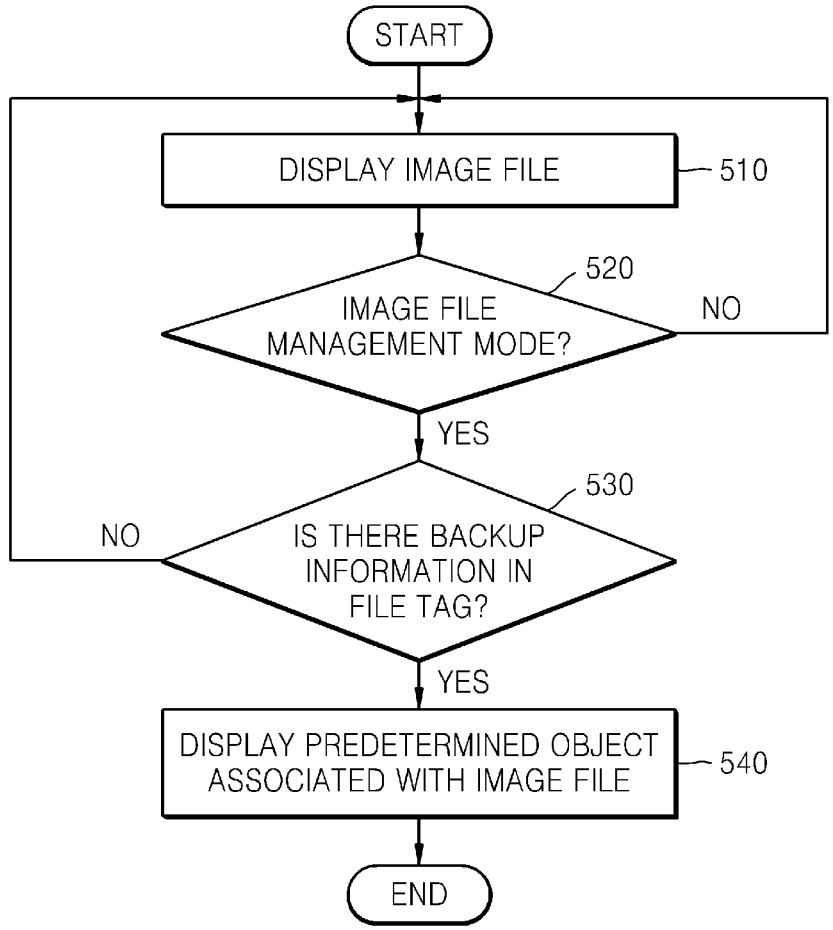

FIG. 9

| NAME | SIZE | TYPE | CORRECTION DATETIME |
|---|---|---|---|
| DSC00361.JPG | 1,252KB | ALSEE JPG FILE | 2013-11-11 2:48 P.M. |
| DSC00362.JPG | 1,153KB | ALSEE JPG FILE | 2013-11-11 2:49 P.M. |
| DSC00363.JPG | 1,021KB | ALSEE JPG FILE | 2013-11-11 2:50 P.M. |
| DSC00364.JPG | 1,375KB | ALSEE JPG FILE | 2013-11-11 2:51 P.M. |
| DSC00365.JPG | 1,002KB | ALSEE JPG FILE | 2013-11-11 2:52 P.M. |
| DSC00366.JPG | 1,371KB | ALSEE JPG FILE | 2013-11-11 2:57 P.M. |
| DSC00367.JPG | 1,201KB | ALSEE JPG FILE | 2013-11-11 3:00 P.M. |

APPARATUS AND METHOD FOR MANAGING IMAGE FILES BY DISPLAYING BACKUP INFORMATION

CROSS-REFERENCE TO RELATED APPLICATION

This application claims priority from Korean Patent Application No. 10-2013-0141473, filed on Nov. 20, 2013, in the Korean Intellectual Property Office, the disclosure of which is incorporated herein in its entirety by reference.

BACKGROUND

1. Field

Apparatuses and methods consistent with exemplary embodiments relate to apparatuses and methods for managing image files by displaying backup information.

2. Description of the Related Art

Due to the development of digital photographing apparatuses, high quality and high-capacity images may be photographed. However, since the digital photographing apparatuses have a limited storage capacity, it is necessary to carefully manage image files that are stored in the digital photographing apparatuses.

Thus, in general, after an image file photographed by a digital photographing apparatus is backed up to another apparatus (for example, copied into a personal computer (PC) or shared through a social network service or a cloud service) in various manners, the image file stored in the digital photographing apparatus is deleted.

However, when a previously backed-up image file is not deleted and is still stored in the digital photographing apparatus together with an image file that is not backed up, it is difficult to detect which image file is a backed-up image file, when managing a memory of the digital photographing apparatus at a later point in time. In particular, the amount of inconvenience increases as the number of stored image files increases. In addition, when a user fails to memorize the image file arrangement of an apparatus in which image files have been backed up, it is very difficult to detect a backed-up image file among the image files stored in the digital photographing apparatus.

SUMMARY

One or more exemplary embodiments display backup information of image files to manage the image files, thereby making it possible for a user to know whether the image files are backed up, a backup time, and the apparatus to which the image files are backed up. One or more exemplary embodiments include apparatuses and methods for managing image files to assist a user to conveniently manage data.

Additional aspects will be set forth in part in the description which follows and, in part, will be apparent from the description, or may be learned by practice of the presented exemplary embodiments.

According to one or more exemplary embodiments, a method for managing image files by displaying backup information includes: displaying at least one image file; reading a file tag of the at least one image file to determine whether there is the backup information; and when there is backup information as a result of the determination, displaying a predetermined object associated with the backup information.

The method may further include: backing up the at least one image file in another apparatus; and recording the backup information of the at least one image file in the file tag.

The recording of the backup information of the at least one image file in the file tag may include generating a thumbnail image file including a thumbnail image and a file tag when the backed-up image file is deleted.

The backup information may include at least one from among at least one backup date related to the at least one image file, at least one backup apparatus name, at least one backup data capacity, and information related to whether at least one piece of original data is backed up.

The file tag may be read when an image file management mode is selected and the image file management mode may be a mode in which an option to delete the at least one image file is selectable.

The displaying of the at least one image file may include displaying an image file list.

The displaying of the predetermined object may include displaying the predetermined object in only an image file including the backup information, among image files included in the image file list.

The displaying of the at least one image file may include displaying an image corresponding to the at least one image file.

The displaying of the predetermined object may include displaying the backup information and the image corresponding to the at least one image file in an overlapping manner.

The at least one image file may include at least one of a picture file, a video file, and an audio file.

According to one or more exemplary embodiments, an apparatus for managing image files by displaying backup information includes: a controller configured to perform control to display at least one image file; and a determiner configured to read a file tag of the at least one image file to determine whether there is backup information, wherein when there is the backup information as a result of the determination, the controller displays a predetermined object associated with the backup information.

The apparatus may further include: a transceiver configured to back up the at least one image file in another apparatus; and a tag recorder configured to record the backup information of the at least one image file in the file tag.

The tag recorder may generate a thumbnail image file including a thumbnail image and a file tag when the backed-up image file is deleted.

The backup information may include at least one from among at least one backup date related to the image file, at least one backup apparatus name, at least one backup data capacity, and information related to whether at least one piece of original data is backed up.

The determiner may read the image file when an image file management mode is selected, and the image file management mode may be a mode in which whether to delete the at least one image file is selectable.

The controller may display an image file list.

The controller may display the predetermined object in only an image file including the backup information, among image files included in the image file list.

The controller may display an image corresponding to the at least one image file.

The controller may display the backup information and the image corresponding to the at least one image file in an overlapping manner.

According to one or more exemplary embodiments, a non-transitory computer-readable recording medium stores a program that, when executed by a computer, performs the above method.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a flowchart of a backup information recording method according to an exemplary embodiment;

FIG. 5 is a flowchart of an image file managing method for managing image files by displaying backup information according to an exemplary embodiment;

FIGS. 9 and 10 illustrate another example of an image file managing method for managing image files by displaying backup information according to an exemplary embodiment.

DETAILED DESCRIPTION

Figure 1:
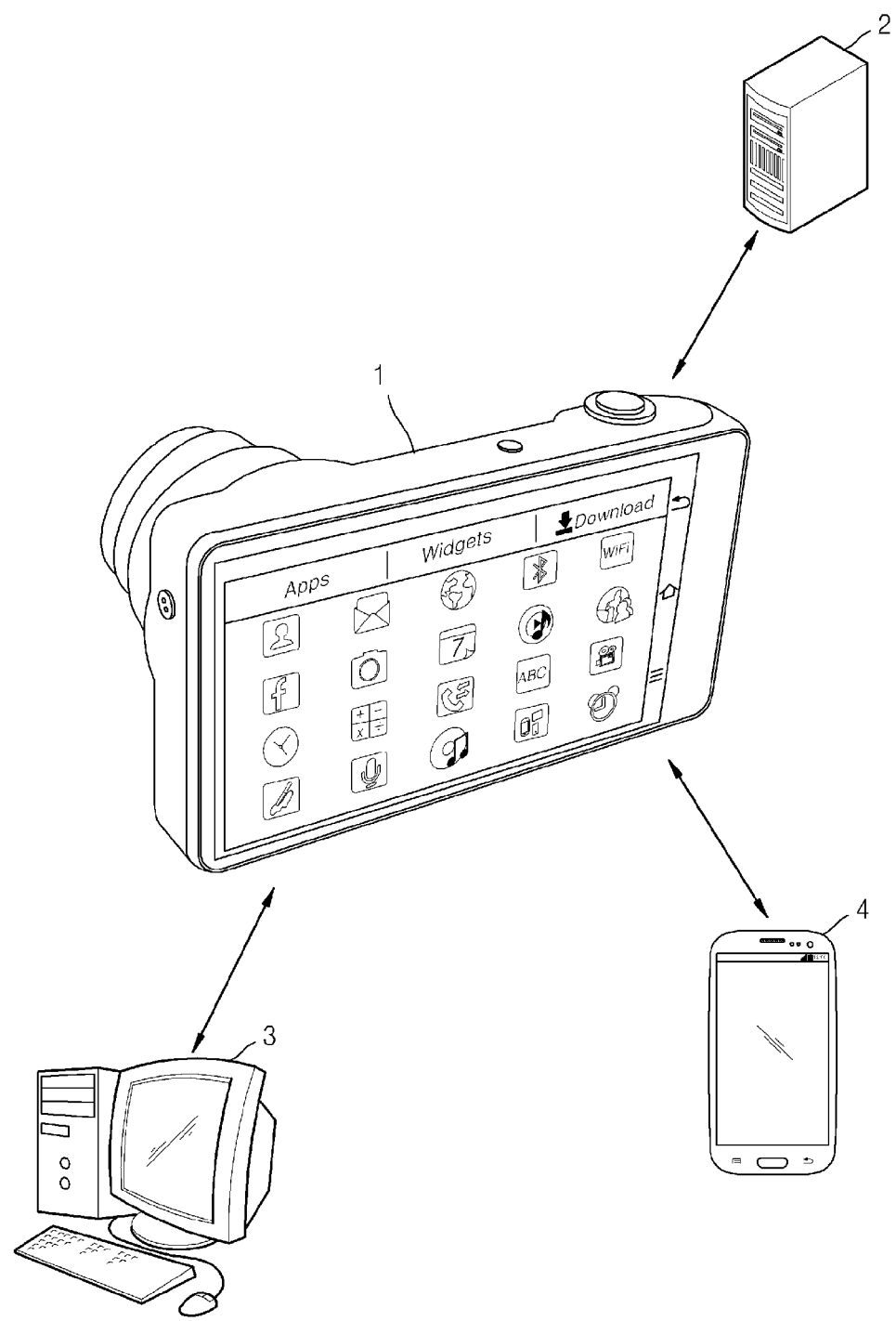
FIG. 1 illustrates an example of backing up an image file stored in a digital photographing apparatus.

Reference will now be made in detail to embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, expressions such as "at least one of," when preceding a list of elements, modify the entire list of elements and do not modify the individual elements of the list.

Hereinafter, methods of implementing and using exemplary embodiments will be described in detail. The terms "unit" and "module" used herein refer to units for processing at least one function or operation, and they may be implemented in hardware, software, or a combination thereof.

In this specification, an exemplary embodiment or exemplary embodiments refer to particular characteristics, structures, and features that are described together in at least one embodiment. Therefore, the terms "embodiment" and "embodiments" appearing throughout the specification do not necessarily denote the same embodiments.

As used herein, the terms "communication", "communication network", and "network" may have the same meaning. These three terms may refer to wired/wireless near field communication networks and broadband data communication networks that may communicate image files between a digital photographing apparatus, a server, a personal computer (PC), and a mobile terminal.

In exemplary embodiments, the term "backup" may be defined as including an operation of "copying" or "sharing" an image file stored in one apparatus into another apparatus.

Hereinafter, exemplary embodiments will be described with reference to the accompanying drawings.

FIG. 1 illustrates an example of backing up an image file stored in a digital photographing apparatus 1.

Referring to FIG. 1, the digital photographing apparatus 1 may photograph an image, generate an image file, and back up the image file by directly or indirectly transmitting the image file to a server 2, a PC 3, or a mobile device 4 through a wired/wireless communication network.

Examples of digital photographing apparatus 1 may include a digital single-lens reflex (DSLR) camera, a mirrorless camera, or a smart phone. However, exemplary embodiments are not limited thereto, and the digital photographing apparatus 1 may be any apparatus that is mounted with a camera module that includes a lens and an imaging device to photograph a subject to generate an image.

The image generated by the digital photographing apparatus 1 may further include a thumbnail image and file tag (e.g., exchangeable image file format (EXIF)) information.

The thumbnail image refers to an image that is generated by reducing an original image to index the original image. Rapid indexing and processing may be possible by displaying a thumbnail image, which is generated by reducing the capacity and size of an original image, instead of the original image when searching for an image file.

The EXIF information refers to image file information that is stored in an image file of the digital photographing apparatus 1. Image data and detailed additional information, such as a maker of the digital photographing apparatus 1, a model thereof, an image editor (software), an image correction datetime, an EXIF version, a shoot datetime, an actual image size of a picture uploaded on the Web, an exposure time (shutter speed), a shoot program (exposure program), a lens focal length, an iris open vale (F-Number), and information about whether a flash is used, may be recorded in the EXIF information according to predetermined settings.

Thus, the image generated by a photographing operation of the digital photographing apparatus 1 may be stored in the form of an image file 30 (see FIG. 3) that includes a thumbnail image 32, an original image 33, and a file tag 31.

An image file managing apparatus 100 (see FIG. 2) for managing image files by displaying backup information according to an exemplary embodiment, which will be described later, may be the digital photographing apparatus 1 or may be included as a module in the digital photographing apparatus 1 to perform operations that will be described later.

According to an exemplary embodiment, the server 2 may provide a cloud service or a social network service. Thus, the digital photographing apparatus 1 may back up an image file through a cloud service or a social network service. For example, a user may upload a photographed image on a cloud server or a social network server through a wireless communication network. In this case, the size of an uploaded image file may be changed according to rules that are set by service providers.

According to an exemplary embodiment, the PC 3 may backup a picture stored in the digital photographing apparatus 1 through a wireless network or a wired network. In this case, since the digital photographing apparatus 1 is used only as a storage, the PC 3 may perform an operation of managing image files by displaying backup information, which will be described later.

According to an exemplary embodiment, the mobile device 4 may be backed up with an image that is photographed by the digital photographing apparatus 1. In this case, the mobile device 4 may be directly backed up with an image file through a wireless communication network, or may be indirectly backed up with an image file by connecting to a cloud service or a social network service through the server 2.

The mobile device 4 may be a notebook computer, a mobile phone, a tablet PC, or a smart phone. However, exemplary embodiments are not limited thereto, and the mobile device 4 may include a communication module, such as a Code Division Multiplex Access (CDMA) module, a Bluetooth module, an Infrared Data Association (IrDA) module, or a wired/wireless Local Area Network (LAN) card, and may be any mobile communication terminal that may perform a predetermined operation by being mounted with a microprocessor that may perform a multimedia play function.

Hereinafter, image file managing methods for managing image files by displaying backup information according to exemplary embodiments will be described in detail with reference to FIGS. 2 to 10.

Figure 2:
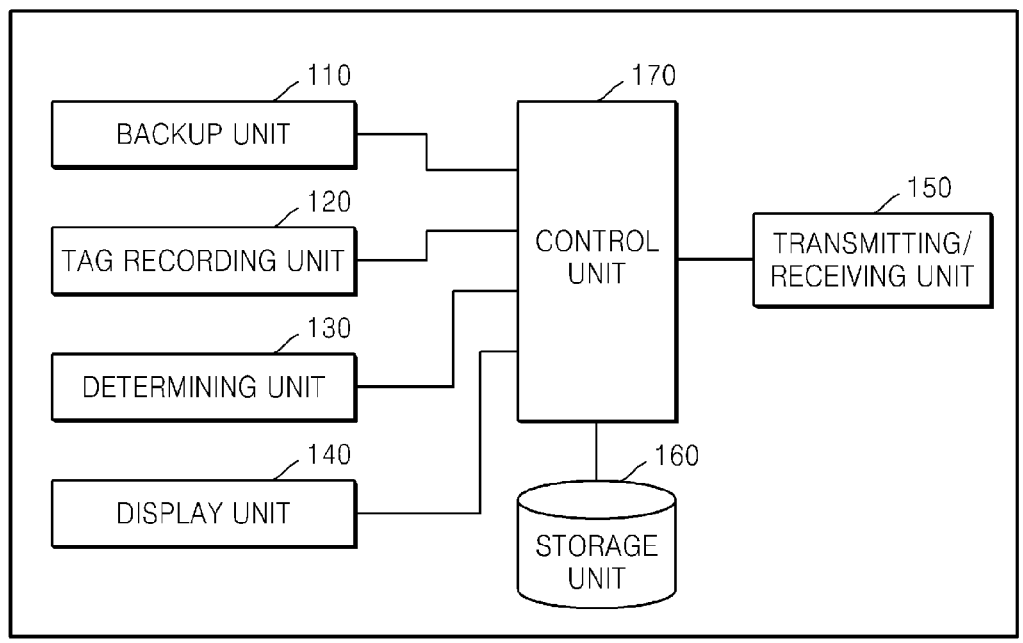
FIG. 2 is a block diagram of an image file managing apparatus for managing images file by displaying backup information according to an exemplary embodiment.

FIG. 2 is a block diagram of an image file managing apparatus 100 for managing images file by displaying backup information according to an exemplary embodiment.

Referring to FIG. 2, the image file managing apparatus 100 may include a backup unit 110, a tag recording unit 120 (e.g., tag recorder), a determining unit 130 (e.g., determiner), a display unit 140, a transmitting/receiving unit 150 (e.g., transceiver), a storage unit 160, and a control unit 170 (e.g., controller).

In the image file managing apparatus 100 of FIG. 2, only elements related to the present exemplary embodiment are illustrated. Therefore, those of ordinary skill in the art will understand that the image file managing apparatus 100 may further include other general-purpose components in addition to the elements illustrated in FIG. 2.

According to an exemplary embodiment, the backup unit 110 may back up a stored image file into another apparatus. When an image file stored according to an exemplary embodiment is an image file stored in the digital photographing apparatus 1 illustrated in FIG. 1, another apparatus may correspond to one of the server 2, the PC 3, and the mobile device 4 illustrated in FIG. 1. However, the exemplary embodiments are not limited thereto, and an opposite case may also be possible.

For example, the backup unit 110 may backup a stored image file into another apparatus based on a user input.

As another example, the backup unit 110 may copy or share a stored image file into another apparatus according to a predetermined condition. The predetermined condition may refer to a predetermined time or period, and may correspond to a case where a specific network is connected. For example, an image file stored in the digital photographing apparatus 1 may be backed up into a cloud server whenever the digital photographing apparatus 1 is connected to the cloud server through a wireless communication network.

According to an exemplary embodiment, the tag recording unit 120 may record backup information of an image file in a file tag. The backup information may include at least one of at least one backup date related to the image file, at least one backup apparatus name, at least one backup data capacity, and information about whether at least one piece of original data is backed up. That is, when there are a plurality of image file backup times, the backup information may include information about each of the plurality of image file backup times.

Figure 3:
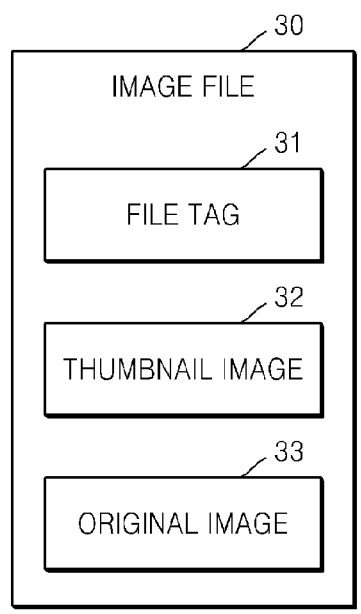
FIG. 3 schematically illustrates a configuration of an image file according to an exemplary embodiment.

For example, FIG. 3 schematically illustrates a configuration of an image file according to an exemplary embodiment.

Referring to FIG. 3, an image file 30 stored according to an exemplary embodiment may include a file tag 31, a thumbnail image 32, and an original image 33.

The file tag 31 refers to image file information that is stored in an image file of the digital photographing apparatus 1. Image data and detailed additional information, such as a maker of the digital photographing apparatus 1, a model thereof, an image editor (software), an image correction datetime, an EXIF version, a shoot datetime, an actual image size of a picture uploaded on the Web, an exposure time (shutter speed), a shoot program (exposure program), a lens focal length, an iris open vale (F-Number), and information about whether a flash is used, may be recorded in the file tag 31 according to predetermined settings. Thus, according to an exemplary embodiment, the tag recording unit 120 may record backup information of an image file in the file tag 31.

The thumbnail image 32 may refer to an image that is generated by reducing the original image 33. Thus, rapid indexing and processing may be possible by displaying the thumbnail image 32, which is generated by reducing the capacity and size of the original image 33, instead of the original image 33 when searching for an image file.

The original image 33 may refer to original image data that is captured by the digital photographing apparatus 1. The original image 33 may vary depending on the specification of the digital photographing apparatus 1, and may be stored in a compressed form according to the Tagged Image File Format (TIFF) or Joint Photographic Experts Group (JPEG) standards.

The image file 30 is not limited to a storage file of a photographed picture, and may be a video file or an audio file that is implemented to include a file tag 31, a thumbnail image 32, and an original image 33 as illustrated in FIG. 3.

According to another exemplary embodiment, when an image file backed up in another apparatus is deleted, the tag recording unit 120 may generate a thumbnail image file that includes only a file tag 31 and a thumbnail image 32. Thus, image file management may be easily performed later on by using the thumbnail image file.

Referring to FIG. 2, when an image file management mode is selected, the determining unit 130 according to an exemplary embodiment may read (extract) a file tag of the image file to determine whether there is backup information. That is, the determining unit 130 may determine that a predetermined image file among the stored image files has been backed up in another apparatus. The image file management mode may be a mode in which whether to copy, shift and delete an image file is selectable. Thus, when there is backup information as a result of the determination of the determining unit 130, the control unit 170 may display a predetermined object associated with the backup information on the display unit 140.

According to an exemplary embodiment, the display unit 140 may include a display unit, such as an LCD module or an LED module, for displaying a picture visually. An image file may be displayed on the display unit 140 under the control of the control unit 170.

According to an exemplary embodiment, the transmitting/receiving unit 150 may include a network interface card (NIC) or a modem, so that the image file managing apparatus 100 may back up an image file through communication with another apparatus. Also, the transmitting/receiving unit 150 may receive other apparatus information from another apparatus in which an image file is backed up. The tag recording unit 120 may store the received other apparatus information as backup information in a file tag of an image file.

According to an exemplary embodiment, the storage unit 160 may store an image file. Also, the storage unit 160 may include a nonvolatile storage medium, such as a hard disk drive (HDD) or a flash memory, that stores digital data.

According to an exemplary embodiment, the control unit 170 displays an image file on the display unit 140, and may also display a predetermined object associated with the backup information on the display unit 140 when there is backup information as a result of the determination of the determining unit 130.

For example, the control unit 170 may perform control to display an image file name list or a thumbnail image list. In this case, when an image file management mode is selected, the control unit 170 may perform control to display a predetermined object only in an image file including backup information, among the image files included in an image file list.

As another example, the control unit 170 may perform control to display an image corresponding to an image file. In this case, when an image file management mode is selected, the control unit 170 may display the backup information and the image corresponding to the image file in an overlapping manner. As another example, the control unit 170 may perform control to display a predetermined object associated with backup information, in the image corresponding to the image file.

As another example, when the image file does not include backup information as a result of the determination of the determining unit 130, the control unit 170 may perform control to display information indicating that there is no backup information.

In addition, the control unit 170 may control the backup unit 110, the tag recording unit 120, the determining unit 130, the display unit 140, the transmitting/receiving unit 150, and the storage unit 160 so that the image file managing apparatus 100 may perform the above-described operations.

Although the image file managing apparatus 100 according to an exemplary embodiment has been described as an independent apparatus for convenience of description, the image file managing apparatus 100 may correspond to at least one of a first apparatus and another apparatus or may be a module that is included in at least one of a first apparatus and another apparatus to perform the above-described operations.

Hereinafter, the image file managing apparatus 100 will be described in detail.

FIG. 4 is a flowchart of a backup information recording method according to an exemplary embodiment.

In operation 410, the backup unit 10 according to an exemplary embodiment may backup a stored image file in another apparatus. For example, the backup unit 110 may copy or share a stored image file into another apparatus based on a user input.

As another example, the backup unit 110 may copy or share a stored image file into another apparatus according to a predetermined condition. The predetermined condition may refer to a predetermined time or period, and may correspond to a case where a specific network is connected. For example, an image file stored in the digital photographing apparatus 1 may be backed up into a cloud server whenever the digital photographing apparatus 1 is connected to the cloud server through a wireless communication network.

In operation 420, the tag recording unit 120 according to an exemplary embodiment may record backup information of an image file in a file tag. The backup information may include at least one of at least one backup date related to the image file, at least one backup apparatus name, at least one backup data capacity, and information about whether at least one piece of original data is backed up.

Also, when an image file backed up in another apparatus is deleted, the tag recording unit 120 may generate a thumbnail image file that includes only a file tag 31 and a thumbnail image 32. Thus, even when a backed-up image is deleted, image file management may be easily performed later on by using the thumbnail image file.

FIG. 5 is a flowchart of an image file managing method for managing image files by displaying backup information according to an exemplary embodiment. FIGS. 6 to 10 illustrate examples of an image file managing method for managing image files by displaying backup information according to an exemplary embodiment.

Referring to FIG. 5, the image file managing method includes operations that are sequentially processed by the image file managing apparatus 100 illustrated in FIG. 2. Thus, even when there are omitted contents, the contents described above in relation to the image file managing apparatus 100 illustrated in FIG. 2 may also be applied to the image file managing method illustrated in FIG. 5.

In operation 510, the control unit 170 according to an exemplary embodiment may display an image file on the display unit 140. For example, the control unit 170 may perform control to display an image file name list 900 (see FIG. 9) or a thumbnail image list 1000 (see FIG. 10). As another example, the control unit 170 may perform control to display an image 600 (see FIG. 6) corresponding to an image file.

In operation 520, the determining unit 130 according to an exemplary embodiment may determine whether an image file management mode is selected.

When an image file management mode is selected, the determining unit 130 may proceed to operation 530 and read (extract) a file tag of the image file to determine whether there is backup information. That is, the determining unit 130 may determine that a predetermined image file among the stored image files has been backed up in another apparatus. The image file management mode may be a mode in which whether to copy, shift and delete an image file is selectable. When there is backup information in the file tag, the image file managing method proceeds to operation 540.

In operation 540, the control unit 170 may display a predetermined object associated with the backup information when there is backup information as a result of the determination of the determining unit 130.

Figure 10:
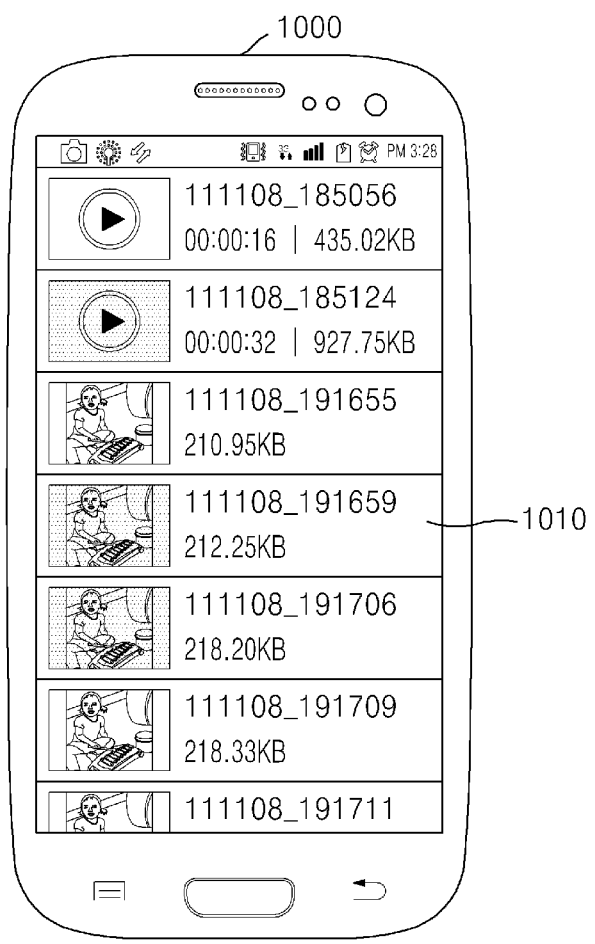

For example, when the control unit 170 perform control to display an image file name list 900 (see FIG. 9) or a thumbnail image list 1000 (see FIG. 10) in operation 510, the control unit 170 may perform control to display a predetermined object 910 or 1010 (see FIG. 9 or 10) only in an image file including backup information, among the image files included in an image file list 900 or 1000 (see FIG. 9 or 10).

As another example, when the control unit 170 performs control to display an image 600 (see FIG. 6) corresponding to an image file, the control unit 170 may display backup information 610 and the image 600 (see FIG. 7) corresponding to the image file in an overlapping manner. As another example, the control unit 170 may perform control to display predetermined objects 620 to 670 (see FIG. 8) associated with backup information, in the image 600 (see FIG. 6) corresponding to the image file.

As another example, when there is no backup information in an image file, the control unit 170 may notify a user that there is no backup information. That is, when there is no backup information as a result of the determination of the determining unit 130, the control unit 170 may display a predetermined object to indicate that there is no backup information.

Figure 6:
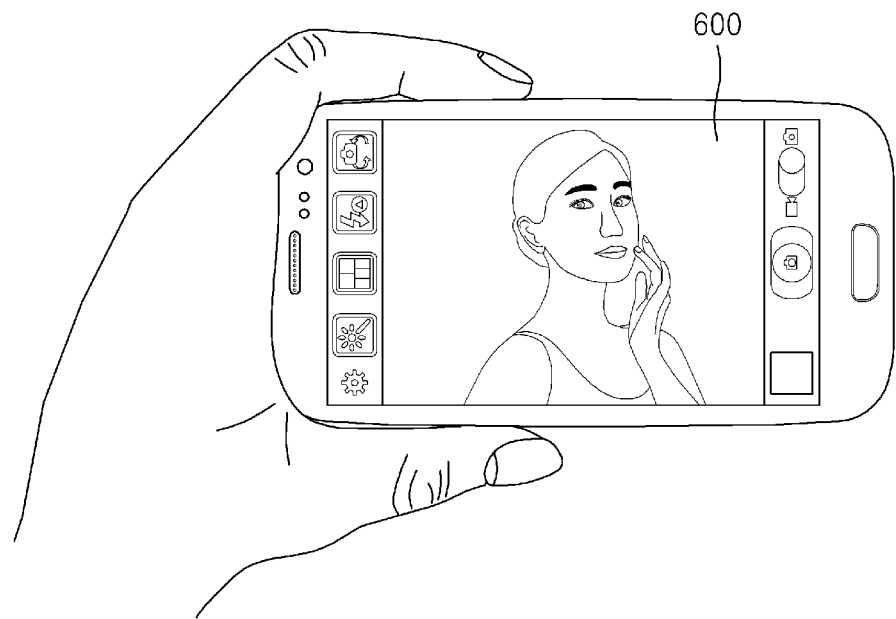
FIG. 6 illustrates an example in which a control unit according to an exemplary embodiment displays an image corresponding to an image file.

FIG. 6 illustrates an example in which the control unit 170 according to an exemplary embodiment displays an image 600 corresponding to an image file. As illustrated in FIG. 6, an image 600 corresponding to an image file may be displayed on the display unit 140. Thus, the user may detect a photographed image.

Thereafter, when the user attempts to delete a file corresponding to a displayed image 600, the image file managing apparatus 100 according to an embodiment may enter into a file management mode for receiving a deletion command input. Herein, the entering into the file management mode may refer to a state in which a user interface is changed to reflect a mode of file management, but is not limited thereto. The entering into the file management mode may include all configurations in which a user interface provided to receive an image file deletion command for file management is displayed.

Figure 7:
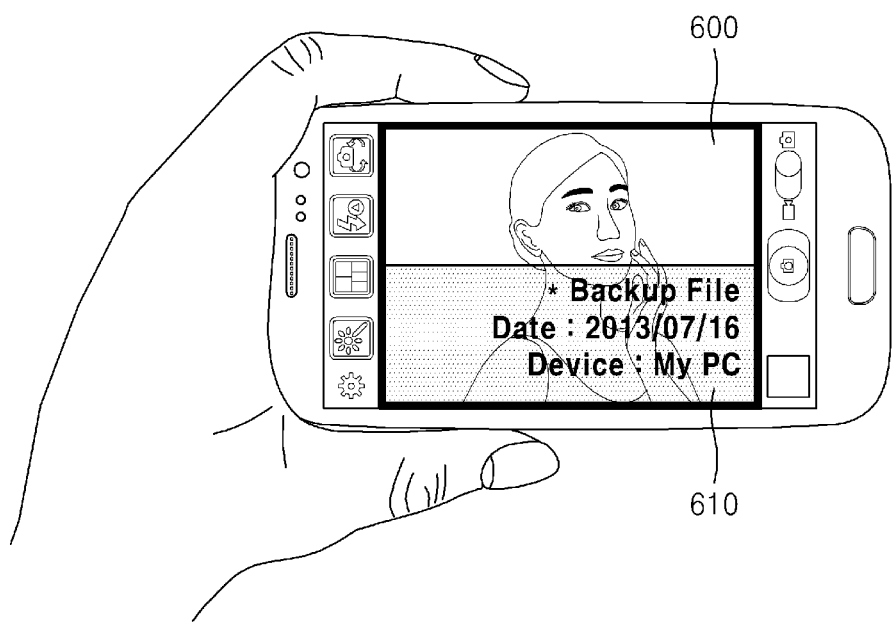
FIG. 7 illustrates an example in which the control unit according to an exemplary embodiment displays backup information and an image corresponding to an image file in an overlapping manner.

FIG. 7 illustrates an example in which the control unit 170 according to an exemplary embodiment displays backup information 610 and an image 600 corresponding to an image file in an overlapping manner.

When entering into the image management mode, the control unit 170 according to an exemplary embodiment may display backup information 610 and an image 600 corresponding to an image file in an overlapping manner. Thus, the user may detect the backup information 610 to know that an image file corresponding to the displayed image 600 includes backup information. That is, the user may know that the image file is backed up in another apparatus. The backup information 610 may include at least one of at least one backup date related to the image file, at least one backup apparatus name, at least one backup data capacity, and information about whether at least one piece of original data is backed up. Although FIG. 7 illustrates and displays a case where an image file is backed up once in an apparatus named "My PC" on 2013/07/16, exemplary embodiments are not limited thereto. For example, when an image file is backed up a plurality of times in a plurality of apparatuses, all information thereof may be displayed.

FIGS. 8A-8F illustrate examples of an image file managing method for managing image files by displaying backup information according to an exemplary embodiment.

As illustrated in FIGS. 8A-8F, when backup information 610 (see FIG. 7) is included in an image file, the control unit 170 according to an exemplary embodiment may perform control to display predetermined objects 620 to 670 associated with the backup information 610 (see FIG. 7), instead of displaying the backup information 610 (see FIG. 7). The predetermined objects 620 to 670 will be described with reference to FIGS. 8A to 8F.

Figure 8A:
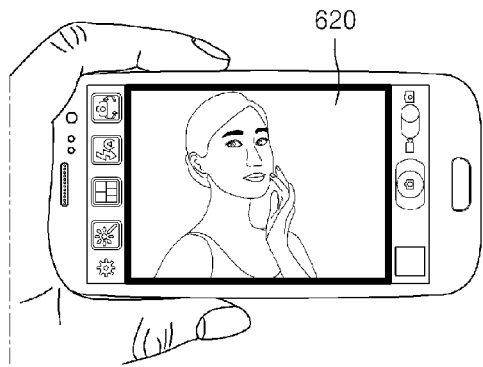
FIGS. 8A-8F illustrates examples of an image file managing method for managing image files by displaying backup information according to an exemplary embodiment.

For example, FIG. 8A illustrates an example in which an object 620 emphasizing a frame of an image 600 including backup information is displayed.

Figure 8B:
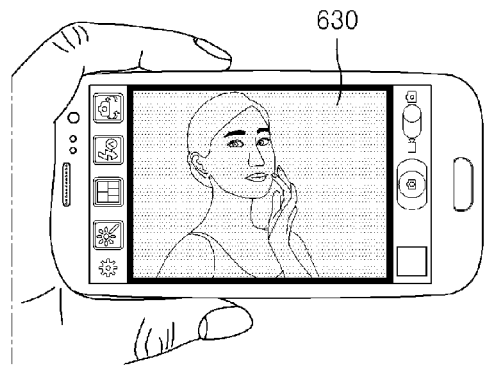

As another example, FIG. 8B illustrates an example in which an object 630 generated by adding a shadow to an image 600 is displayed.

Figure 8C:
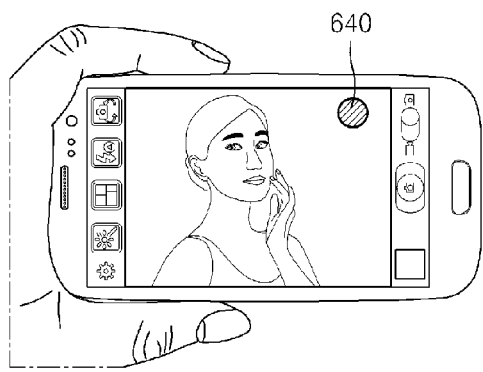

As another example, FIG. 8C illustrates an example in which an object 640 having a predetermined shape is displayed at one side of an image 600.

Figure 8D:
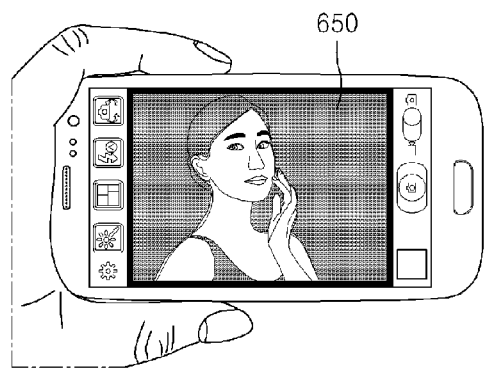

As another example, FIG. 8D illustrates an example in which an object 650 generated by reversing the color of an image 600 is displayed.

Figure 8E:
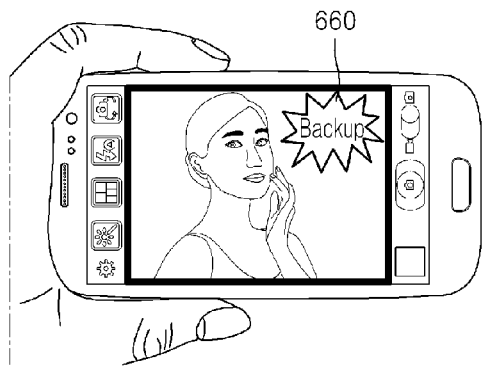

As another example, FIG. 8E illustrates an example in which an object 660 including a predetermined description phrase is displayed at one side of an image 600.

Figure 8F:
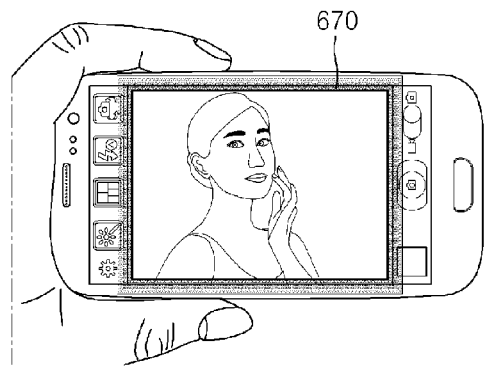

As another example, FIG. 8F illustrates another example in which an object 670 emphasizing a frame of an image 600 is displayed.

As described above, only the image 600 illustrated in FIG. 6 is displayed when an image file does not include backup information, and the corresponding objects 620 to 670 may be additionally displayed when an image file includes backup information.

FIGS. 9 and 10 illustrate other examples of an image file managing method for managing image files by displaying backup information according to an exemplary embodiment.

According to an exemplary embodiment, the control unit 170 may display an image file list. Referring to FIGS. 9 and 10, an image file name list 900 (see FIG. 9) or a thumbnail image list 1000 (see FIG. 10) may be displayed.

In this case, the control unit 170 may perform control to display a predetermined object only in an image file including backup information, among the image files included in an image file list 900 or 1000 (see FIG. 9 or 1000). For example, an object 910 or 1010 (see FIG. 9 or 10) having an added shadow may be displayed only in an image file including image backup information.

Although FIGS. 7 to 10 illustrate examples of an image file managing method for managing image files by displaying backup information according to an exemplary embodiment, all of the embodiments are not limited thereto. That is, those of ordinary skill in the art will readily understand that any display capable of displaying backup information of an image file may be included in the present exemplary embodiment.

As described above, according to the one or more of the above exemplary embodiments, the image file managing method may display only the image 600 of FIG. 6 when an image file does not include backup information, and may additionally display the corresponding objects 620 to 670 when an image file includes backup information.

According to one or more exemplary embodiments, the image file managing apparatus 100 may display backup information of image files to manage the image files, thereby making it possible for the user to know whether the image files are backed up, a backup time, and a backup apparatus. Accordingly, the user may conveniently manage data.

In addition, other exemplary embodiments may also be implemented through computer-readable code/instructions in/on a medium, e.g., a computer-readable medium, to control at least one processing element to implement any above described embodiment. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element may include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method for managing image files by displaying backup information, the method comprising:
    displaying at least one an image file;
    backing up at the least one image file in another apparatus; and
    recording the backup information of the at least one image file in a file tag which indicates whether the at least one image file is backed up,
    wherein the recording of the backup information of the at least one image file in the file tag comprises generating a thumbnail image file comprising a thumbnail image and the file tag when the backed-up image file is deleted.

2. The method of claim 1, further comprising:
    reading a file tag of the at least one image file to determine whether there is a backup information; and
    when there is the backup information as a result of the determination, displaying a predetermined object associated with the backup information.

3. The method of claim 1, wherein the backup information comprises at least one from among at least one backup date related to the at least one image file, at least one backup apparatus name, at least one backup data capacity, and information related to whether at least one piece of original data is backed up.

4. The method of claim 1, wherein the file tag is read when an image file management mode is selected, the image file management mode being a mode in which an option to delete the at least one image file is selectable.

5. The method of claim 1, wherein the displaying of the at least one image file comprises displaying an image file list.

6. The method of claim 2, wherein the displaying of the predetermined object comprises displaying the predetermined object in only an image file including the backup information, among image files comprised in an image file list.

7. The method of claim 1, wherein the displaying of the at least one image file comprises displaying an image corresponding to the at least one image file.

8. The method of claim 2, wherein the displaying of the predetermined object comprises displaying the backup information and an image corresponding to the at least one image file in an overlapping manner.

9. The method of claim 1, wherein the at least one image file comprises at least one from among a picture file, a video file, and an audio file.

10. An apparatus for managing image files by displaying backup information, the apparatus comprising:
    a memory to store a program, which when executed, performs processes;
    a controller configured to perform control by executing the program to display at least one image file, to back up the at least one image file in another apparatus, and to record the backup information of the at least one image file in a file tag which indicates whether the at least one image file is backed up,
    wherein the controller generates a thumbnail image file comprising a thumbnail image and the file tag when the backed-up image file is deleted.

11. The apparatus of claim 10, the controller further performing: reading a file tag of the at least one image file to determine whether there is backup information, wherein when there is the backup information as a result of the determination, the controller displays a predetermined object associated with the backup information.

12. The apparatus of claim 10, wherein the backup information comprises at least one from among at least one backup date related to the image file, at least one backup apparatus name, at least one backup data capacity, and information related to whether at least one piece of original data is backed up.

13. The apparatus of claim 10, wherein the controller reads the file tag when an image file management mode is selected, the image file management mode being a mode in which whether to delete the at least one image file is selectable.

14. The apparatus of claim 10, wherein the controller displays an image file list.

15. The apparatus of claim 14, wherein the controller displays the predetermined object in only an image file including the backup information, among image files comprised in the image file list.

16. The apparatus of claim 10, wherein the controller displays an image corresponding to the at least one image file.

17. The apparatus of claim 16, wherein the controller displays the backup information and the image corresponding to the at least one image file in an overlapping manner.

18. A non-transitory computer-readable recording medium that stores a program that, when executed by a computer, performs the method of claim 1.

* * * * *